United States Patent
Tokuda et al.

(10) Patent No.: US 8,338,899 B2
(45) Date of Patent: Dec. 25, 2012

(54) PRESSURE SENSOR AND MANUFACTURING METHOD THEREOF

(75) Inventors: Tomohisa Tokuda, Tokyo (JP); Hirofumi Tojo, Tokyo (JP)

(73) Assignee: Azbil Corporation, Tokyo (JP)

( * ) Notice: Subject to any disclaimer, the term of this patent is extended or adjusted under 35 U.S.C. 154(b) by 149 days.

(21) Appl. No.: 12/768,221

(22) Filed: Apr. 27, 2010

(65) Prior Publication Data

US 2010/0270629 A1      Oct. 28, 2010

(30) Foreign Application Priority Data

Apr. 28, 2009   (JP) .................................. 2009-109259

(51) Int. Cl.
*H01L 29/84*    (2006.01)
(52) U.S. Cl. .......... 257/419; 257/415; 257/417; 438/51; 438/53
(58) Field of Classification Search .................. 257/419, 257/415, 417; 438/50, 51, 53
See application file for complete search history.

(56) References Cited

U.S. PATENT DOCUMENTS

| | | | |
|---|---|---|---|
| 4,975,390 A * | 12/1990 | Fujii et al. ........................ | 438/53 |
| 5,452,268 A * | 9/1995 | Bernstein ........................ | 367/181 |
| 6,619,133 B1 | 9/2003 | Goshoo et al. | |
| 6,718,824 B2 * | 4/2004 | Ito et al. ..................... | 73/514.16 |
| 7,131,337 B2 * | 11/2006 | Kato et al. ..................... | 73/754 |
| 7,179,668 B2 * | 2/2007 | Baney et al. ..................... | 438/22 |
| 7,368,313 B2 | 5/2008 | Benzel et al. | |
| 7,563,634 B2 * | 7/2009 | Benzel ........................... | 438/53 |
| 7,781,249 B2 * | 8/2010 | Laming et al. .................. | 438/51 |
| 2008/0083957 A1 * | 4/2008 | Wei et al. ....................... | 257/415 |
| 2010/0314701 A1 * | 12/2010 | Tokuda et al. .................. | 257/419 |

FOREIGN PATENT DOCUMENTS

| | | |
|---|---|---|
| CN | 1292868 A | 4/2001 |
| CN | 1657401 A | 8/2005 |
| JP | 2002-208708 A | 7/2002 |
| JP | 2002-277337 A | 9/2002 |

* cited by examiner

*Primary Examiner* — Eugene Lee
(74) *Attorney, Agent, or Firm* — Troutman Sanders LLP

(57) ABSTRACT

The pressure sensor according to the present invention has a sensor chip having a first semiconductor layer that has an opening portion, and a second semiconductor layer, formed on the first semiconductor layer, having a recessed portion that forms a diaphragm and a base, having a pressure guiding hole that is connected to the opening portion, bonded to the sensor chip. The recessed portion in the second semiconductor layer is larger than the opening portion of the first semiconductor layer. The opening portion of the first semiconductor layer has an opening diameter on the second semiconductor layer side that is larger than the opening diameter on the base side.

7 Claims, 5 Drawing Sheets

PRESSURE SENSOR AND MANUFACTURING METHOD THEREOF

CROSS REFERENCE TO RELATED APPLICATIONS

The present application claims priority under 35 U.S.C. §119 to Japanese Patent Application No. 2009-109259, filed Apr. 28, 2009, which is incorporated herein by reference.

FIELD OF TECHNOLOGY

The present invention relates to a pressure sensor and to the manufacturing method thereof, and, in particular, relates to a pressure sensor having a diaphragm, and to the manufacturing method thereof.

BACKGROUND OF THE INVENTION

Pressure sensors that use the piezo resistance effect of semiconductors are small, light, and have high sensitivity, and thus are used widely in fields such as industrial instruments, medicine, and the like. In this type of pressure sensor, a strain gauge is formed on a semiconductor diaphragm. The strain gauge deforms depending on the pressure that is applied to the diaphragm. The change in resistance of the strain gauge due to the piezo resistance effect is detected to measure the pressure. In order to mitigate the stress from the package, the sensor chip wherein the diaphragm is formed is bonded to a base made out of, for example, glass. (Japanese Unexamined Patent Application Publication 2002-277337)

Here the structure of the pressure sensor will be explained using FIG. 5. FIG. 5 is a cross-sectional diagram illustrating the structure of a conventional pressure sensor. The sensor chip 10 is structured from a single crystal silicon substrate. Additionally, strain gauges 5 and 15, having the piezo resistance effect, are formed on the sensor chip 10. The center portion of the sensor chip 10 is etched to form a diaphragm 4. Here the center portion of the sensor chip 10 is etched to a tapered shape. Doing so increases the dimension of the opening of the diaphragm sensor to larger than the dimension of the diaphragm. A base 11 is bonded to the sensor chip 10. The base 11 is bonded to the sensor chip 10 at the peripheral portion of the diaphragm 4.

Japanese Unexamined Patent Application Publication 2002-208708 discloses a pressure sensor wherein, in order to mitigate the concentration of stresses, the edge portion of the sensor region side of the diaphragm is formed in an R shape.

It is necessary to increase the size of the diaphragm 4 in order to increase the pressure sensitivity of the pressure sensor. Additionally, it is necessary for the surface area of the bonding region (the bonded portion) to be large in order to ensure the bonding strength with the base 11. However, when the size of the sensor chip 10 is held constant, increasing the size of the diaphragm 4 in order to increase the sensitivity reduces the bonding region with the base, and increasing the size of the bonding region in order to increase the reliability of the bond reduces the size of the diaphragm 4. Consequently, there is a problem in that the size of the sensor chip 10 must be increased in order to both increase the pressure sensitivity and secure the bonding strength.

The present invention was created in order to solve this type of problem area, and the object thereof is to provide a small, high-performance pressure sensor, and provide a manufacturing method thereof.

SUMMARY OF THE INVENTION

The pressure sensor according to the present invention includes a sensor chip having a first semiconductor layer that has an opening portion, and a second semiconductor layer, formed on the first semiconductor layer, that has a recessed portion that serves as a diaphragm; and a base, to which the sensor chip is bonded, having a pressure guide hole that connects to the opening portion; wherein: the recessed portion of the second semiconductor layer is larger than the opening portion of the first semiconductor layer; and the opening portion of the first semiconductor layer has an opening diameter on the second semiconductor layer side that is larger than the opening diameter on the base side. This makes it possible to achieve a pressure sensor that is smaller with higher bonding reliability.

Preferably an insulating layer, having an opening portion, is formed between the first semiconductor layer and the second semiconductor layer. Doing so makes it possible to cause the thickness of the diaphragm to be uniform.

Preferably a non-bonded portion wherein a gap is provided between the sensor chip and the base is formed at the periphery of the bonded portion between the sensor chip and the base. Doing so enables an increase in the signal-to-noise ratio.

Preferably the edge of the opening in the recessed portion of the second semiconductor layer extends towards the outside with a width dimension of no less than 5 μm and no more than 50 μm beyond the side wall of the opening portion of the second semiconductor layer side of the first semiconductor layer.

The pressure sensor manufacturing method according to the present invention is a method for manufacturing a pressure sensor having a sensor chip that is provided with a first semiconductor layer and a second semiconductor layer that becomes a diaphragm that is the pressure sensitive region, and comprises: a step for forming an opening portion in the first semiconductor layer in a portion that will become a pressure sensitive region, through anisotropically etching the first semiconductor layer; a step for forming a passivating layer, having a thickness distribution so as to have a thinner layer thickness on the second semiconductor layer side on a side wall in the opening portion of the first semiconductor layer; a step, after the formation of the passivating layer, for etching the side wall in the opening portion of the first semiconductor layer to form the opening portion of the first semiconductor layer so that the opening diameter on the second semiconductor layer side will be greater than the opening diameter on the opposing side, and, in order to form the diaphragm, etching the second semiconductor layer of the portion that will form the pressure sensitive region, so as to form, in the second semiconductor layer, a recessed portion that is larger than the opening portion of the first semiconductor layer; and a step for bonding a base to the sensor chip. This enables a large region for bonding to the base to be secured even when the size of the diaphragm is increased. As a result, this enables the achievement of a small pressure sensor with high bonding reliability.

After forming the opening portion in the first semiconductor layer through anisotropic etching, a process for providing an opening portion through etching the insulating layer that is provided between the first semiconductor layer and the second semiconductor layer may also provided, where, in the process for forming the opening portion in the first semiconductor layer, anisotropic etching may be performed using, as an etching stopper, the insulating layer that is provided between the first semiconductor layer and the second semiconductor layer. Doing so enables the thickness of the diaphragm to be made uniform.

In the process for bonding the sensor chip to the base, preferably a non-bonded portion, wherein a gap is provided between the sensor chip and the base, should be formed at the periphery of the bonded portion between the sensor chip and the base. This enables an increase in the signal-to-noise ratio.

The present invention enables the provision of a small and high-performance pressure sensor, and of a manufacturing method thereof.

DETAILED DESCRIPTION OF THE INVENTION

Figure 1:
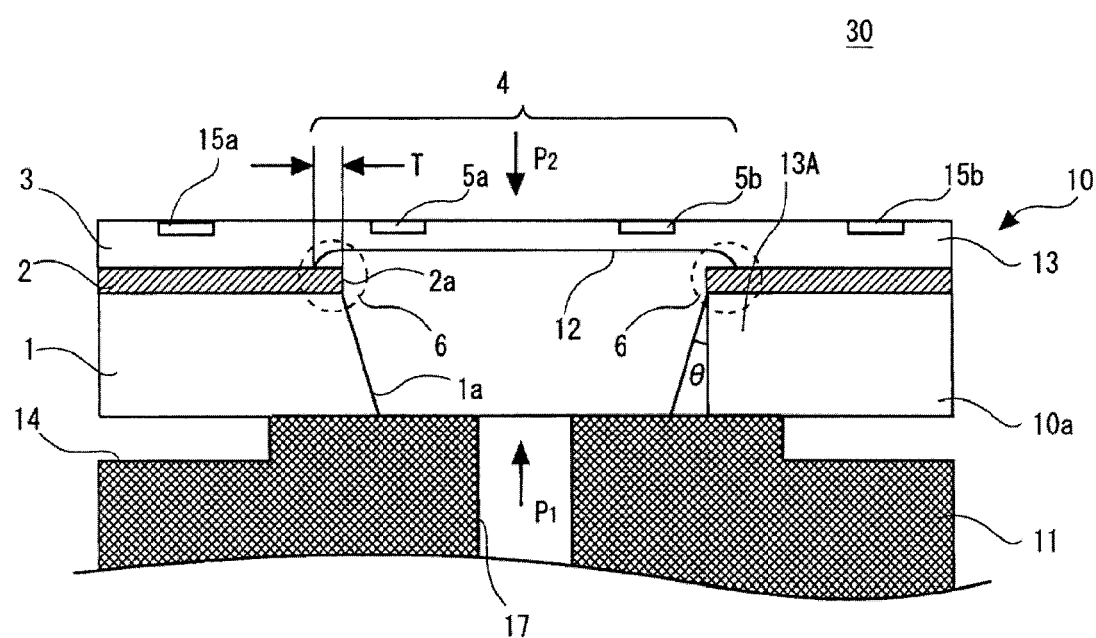
FIG. 1 is a side view cross-sectional diagram illustrating the structure of a pressure sensor according to a form of embodiment according to the present invention.
Figure 2:
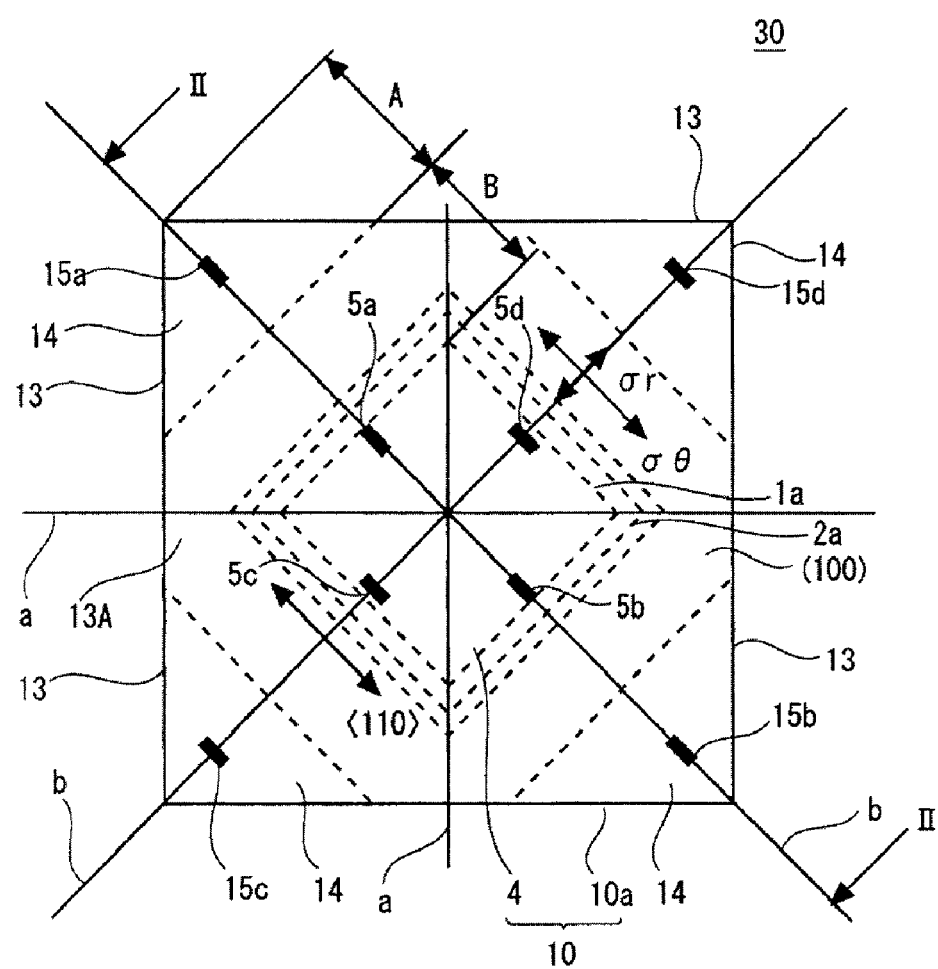
FIG. 2 is a plan view illustrating a structure for a pressure sensor according to a form of embodiment according to the present invention.

A specific form of embodiment to which the present invention is applied will be described in detail below in reference to the figures. FIG. 1 is a side view cross-sectional diagram illustrating a structure for a pressure sensor according to the present form of embodiment. FIG. 2 is a top view of the present pressure sensor. FIG. 1 is a cross-sectional diagram along the section II-II in FIG. 2, where the pressure sensor according to the present form of embodiment is a semiconductor pressure sensor that uses the piezo resistance effect of semiconductors.

The pressure sensor 30 has a square sensor chip 10 that is made out of n-type single crystal silicon wherein the crystal orientation is the (100) surface, and a base 11 to which the sensor chip 10 is bonded. The sensor chip 10 comprises a first semiconductor layer 1 that serves as a substrate, an insulating layer 2, and a second semiconductor layer 3. That is, the sensor chip 10 has a three-layer structure comprising the first semiconductor layer 1, the insulating layer 2, and the second semiconductor layer 3. The first semiconductor layer 1 and the second semiconductor layer 3 are structured from n-type single crystal silicon layers. The insulating layer 2 is structured from, for example, an $SiO_2$ layer. The insulating layer 2 is fabricated on top of the first semiconductor layer 1. Additionally, the second semiconductor layer 3 is fabricated on top of the insulating layer 2. Consequently, the insulating layer 2 is disposed between the first semiconductor layer 1 and the second semiconductor layer 3. The insulating layer 2, when the first semiconductor layer 1 is being etched, functions as an etching stopper. The second semiconductor layer 3 structures a diaphragm 4. The diaphragm 4 is disposed in the center portion of the sensor chip 10.

In the portion of that forms the pressure sensitive region, opening portions 1a and 2a are formed in the first semiconductor layer 1 and the insulating layer 2, to expose the second semiconductor layer 3. The opening portion 1a of the first semiconductor layer 1 has an opening diameter on the second semiconductor layer 3 side that is larger than the opening diameter on the base 11 side. The side wall in the opening portion 1a of the first semiconductor layer 1 in the present form of embodiment is an inclined surface in a reverse-taper shape that is inclined with an angle θ relative to the direction that is perpendicular to the plane of bonding of the second semiconductor layer 3 side of the first semiconductor layer 1. At this time, the angle θ of the inclined plane is between about 3° and 20°. The opening portion 2a in the insulating layer 2 is essentially equal to the opening diameter of the second semiconductor layer 3 side in the opening portion 1a of the first semiconductor layer 1. Note that while in the present form of embodiment the opening portion 2a of the insulating layer 2 is essentially equal to the opening diameter of the second semiconductor layer 3 side in the opening portion 1a of the first semiconductor layer 1, it need not necessarily be it equal.

Note that the angle θ should be greater than 0°, and if the opening diameter on the second semiconductor layer 3 side is larger than the opening diameter on the base 11 side, then the shape, such as a linear or stacked taper shape, is not important. Moreover, while the greater the angle θ the greater the bonding surface area with the base element that can be secured, this should be designed as appropriate depending on the size of the sensor chip 10.

Additionally, in the portion that will become the pressure sensitive region, a recessed portion 12 is formed in the center of the back surface of the second semiconductor layer 3. That is, in the portion that becomes the pressure sensitive region, the thickness of the second semiconductor layer 3 is thinner when compared to the other portions. The portion wherein the second semiconductor layer 3 has been pinned in this way becomes the diaphragm 4 for measuring the pressure. Here a square diaphragm 4 is formed in the center portion of the surface of the sensor chip 10, when viewed from the top. The region corresponding to this diaphragm 4 is the pressure sensitive region for the pressure sensor 30.

The recessed portion 12 is formed in a square shape. The recessed portion 12, as illustrated in FIG. 2, is slightly larger than the opening diameter of the opening portion 1a and of the opening portion 2a. That is, the flat region of the square pressure sensitive region is slightly larger than the flat region of the square opening portion 1a and the square opening portion 2a. Doing so enables the pressure sensitive region to be made larger. As a result, the measurement sensitivity of the pressure sensor 30 can be increased.

The sensor chip 10 is provided with a thick wall portion 10a surrounding the diaphragm 4. The thick wall portion 10a is formed at the outer peripheral portion of the sensor chip 10. On the back surface side of the sensor chip 10, the thick wall portion 10a of the sensor chip 10 is anode bonded to the base 11. The base 11 is formed as a rectangular solid having essentially the same size as the sensor chip 10, from a glass that can be anode bonded such as Pyrex Glass™ or Tempax Glass™. In the center of the base 11, a through hole (pressure guide hole) 17 is formed for guiding the measurement pressure P1 to the back side of the diaphragm 4 through the opening portions 1a and 2a of the first semiconductor layer 1 and the insulating layer 2. That is, the through hole 17 connects to the opening portion 1a, the opening portion 2a, and the recessed portion 12.

The diaphragm 4 is formed in a state wherein the diagonal lines a and a thereof are inclined at approximately 45° relative to the sensor chip, so as to be perpendicular to the edges of the sensor chip. Furthermore, four differential pressure or pressure strain gauges 5a through 5d, for detecting differential pressure or pressure that acts on the piezo region, are formed in the vicinity of the peripheral edges of the front surface of the diaphragm 4. The strain gauges 5a through 5d are disposed so as to be positioned on the diagonal lines b and b of the sensor chip 10. Furthermore, these strain gauges 5a through 5d are formed with the crystal axis orientation of <110> to maximize the piezo resistance factor in the crystal face orientation (100) of the sensor chip 10.

In this way, strain gauges 5a through 5d that have the piezo resistance effect are formed on the top surface side of the second semiconductor layer 3. The strain gauges 5a through 5d are disposed on the diaphragm 4. Here four strain gauges 5a through 5d are formed on the second semiconductor layer 3. Note that metal electrodes (not shown) for connecting to the strain gauges 5a through 5d are formed on the top surface of the second semiconductor layer 3. Furthermore, the strain gauges 5a through 5d are connected in a bridge circuit. That is, these strain gauges 5a through 5d structure a Wheatstone bridge circuit. The diaphragm 4 deforms with the differential pressure in the space that is partitioned by the diaphragm 4. It in the strain gauges 5a through 5d, the resistance varies depending on the amount of deformation of the diaphragm 4. The pressure can be measured by detecting the amount of change in the resistances.

For example, when the measurement pressures P1 and P2 are applied to the front and the back of the diaphragm 4, the diaphragm 4 deforms. The relative resistances of each of the strain gauges 5a through 5d change in accordance with the deformation of the diaphragm 4. As a result, the differential pressure signals of the measurement pressures P1 and P2 are outputted differentially.

The rates of change of the resistances in the strain gauges 5a through 5d at this time are expressed by the following equation:

$$\Delta R/R = \pi_{44}(\sigma r - \sigma \theta)/2 \quad (1)$$

Here $\pi_{44}$ is the piezo resistance coefficient, $\sigma r$ is the stress in the perpendicular direction on the diaphragm 4, and $\sigma \theta$ is the stress in the direction parallel to the edges of the diaphragm 4.

The thick wall portion 10a of the sensor chip 10 is bonded to the front surface of the base 11. At this time, as described above, the opening portion 1a of the first semiconductor layer 1 is formed so that the opening diameter on the second semiconductor layer 3 side thereof is greater than the opening diameter on the base 11 side. Because of this, it is possible for the thick wall portion 10a of the sensor chip 10 to secure a larger region for bonding with the base 11, even if the diaphragm 4 is not made larger. This makes a possible to increase the strength of bonding, even without increasing the size of the chip. Consequently, it is possible to increase the reliability along with achieving a reduction in the size of the pressure sensor 30. This makes it possible to achieve a sensor chip that is small and with higher performance than conventionally.

Here, even if the difference in the measured pressures P1 and P2 that are applied to both of the sides of the diaphragm 4 is zero, still, if there are fluctuations in the static pressure or the temperature, differences in materials or shapes will cause the difference between $\sigma r - \sigma \theta$ in Equation (1), above, to be non-zero. Because of this, a problem arises in that there will be an output from the bridge circuit, causing a shift in the zero point. In this way, depending on the change in the static pressure or the temperature, $\sigma r$ will not equal $\sigma \theta$, causing a change in the resistance values for the gauges 5a through 5d. That is, the bonding surface between the sensor chip 10 and the base 11 has a relationship with the deformation of the diaphragm 4. In this, if the diagonal lines a and a of the square diaphragm 4 are formed so as to be angled at about 45°, so as to be perpendicular to the edges of the square sensor chip 10, then the lengths of the bonding surface in the direction of the diagonal lines b, of the bonding surface of the sensor chip 10, will be longer. Because of this, if the entirety of the back surface of the thick wall portion 10a is bonded, then the stress $\sigma r$ in the perpendicular direction at the edges of the diaphragm 4 will be larger than the stress $\sigma \theta$ parallel to the edges of the diaphragm 4. A zero point shift will occur as a result, making it impossible to detect the differential pressure with high accuracy.

Given this, in order to mitigate the stress and reduce the crosstalk, only a portion of the back surface of the thick wall portion 10a of the sensor chip 10 is bonded to the base 11. That is, a portion of the top surface of the base 11 is formed with a stepped portion 14. Furthermore, the portion wherein the stepped portion 14 is formed is caused to be a non-bonded portion 13 by being separated from the base 11, and the portion wherein the stepped portion 14 is not formed is caused to be a bonded portion 13A, bonded to the base 11.

The location at which the non-bonded portion 13 is formed is at each of the corners of the back surface of the sensor chip 10, and the non-bonded portions 13 are positioned further towards the outside than the bonded portion 13A. That is, the bonded portion 13 A is a frame having an octagonal outer shape, surrounding the diaphragm 4.

The size of the non-bonded portion 13 is formed so that the stress $\sigma r$ in the direction that is perpendicular to the edge of the diaphragm 4, occurring in the strain gauges 5a through 5b, will be equal to the stress $\sigma \theta$ in the direction that is parallel to the edge of the diaphragm 4. That is, it is possible to minimize the zero point shift due to static pressure or temperature by causing $\sigma r$ to equal $\sigma \theta$ by optimizing the ratio A/B of the length A of the non-bonded portion 13 and the length B of the bonded portion 13A. Doing so can increase the signal-to-noise ratio.

The stepped portions 14 are positioned at the corner portions corresponding to each of the non-bonded portions 13, in the base 11. That is, in the non-bonded portions 13, gaps are formed between the base 11 and the sensor chip 10, corresponding to the height of the stepped portions 14. Note that the stepped portions may, of course, be formed on the back surface side of the thick wall portion 10a to provide the non-bonded portions 13.

As described above, optimizing A/B to cause $\sigma r = \sigma \theta$ is able to minimize the zero point shift due to static pressure or temperature. Note that in practice it is extremely difficult to cause $\sigma r$ to be exactly equal to $\sigma \theta$. In this case, it is possible to correct the detection signals of the strain gauges 5a through 5d for the differential pressure or pressure detection through providing the static pressure detecting strain gauges 15a through 15d on the same sensor chip. Doing so makes it possible to measure the differential pressure or pressure with higher accuracy.

The strain gauges 15a through 15d that have the piezo resistance effect are formed on the front surface side of the second semiconductor layer 3. The strain gauges 15a through 15d are formed on the outside of the diaphragm 4. The strain gauges 15a through 15d are formed on the front surface of the sensor chip 10. The strain gauges 15a through 15d are formed on the front surface of the thick wall portion 10a corresponding to the non-bonded portions 13. The detection signals of the differential pressure or pressure detecting strain gauges 5a through 5d are corrected by the detection signals wherein the static pressure is detected by the strain gauges 15a through 15d. The static pressure detecting strain gauges 15a through 15d are positioned on the diagonal lines b and b of the sensor chip 10. Furthermore, the strain gauges 15a through 15d are provided so as to be positioned on each of the diagonal portions of the sensor chip 10. In addition, the strain gauges 15a through 15d are formed so as to be long in the direction of the <110> crystal axis so as to maximize the piezo resistance factor in the crystal face orientation (100) of the sensor chip 10. The strain gauges 15a through 15d are formed through a diffusion or ion implantation process, in the same manner as the differential pressure or pressure detecting strain gauges 5a through 5d. Furthermore, the strain gauges 15a through 15d are connected in a Wheatstone Bridge by leads, not shown. The strain gauges 15a through 15d detect static pressure through changes in the relative resistances accompanying deformation of the non-bonded portions 13 due to static pressure. Here the strain gauges 15a through 15d correct, through the detection signals thereof, the detection signals of the strain gauges 5a through 5d for differential pressure or pressure detection.

The strain gauges 15a through 15d are disposed on the front surface of the non-bonded portion 13. Additionally, the strain gauges 15a through 15d are disposed at positions that are separated from the center of the diaphragm 4. When a non-bonded portion 13 is provided, a region with a high amount of stress produced by static pressure is produced. When the strain gauges 15a through 15d are provided on the surface of the sensor chip 10 in the non-bonded portion 13, in this region, then the sensitivity to the static pressure will be increased and the sensitivity to the differential pressure will be decreased. Doing so makes it possible to reduce the crosstalk, making it possible to correct, with high accuracy, the signals detected by the strain gauges 5a through 5d for detecting the differential pressure or the pressure. The strain gauges 15a through 15d may be disposed so that a portion of thereof extends to the front surface of the sensor chip 10 at the bonded portion 13A. Note that the length of the portion that extends to the bonded portion 13A preferably is shorter than the length of the portion that is provided in the non-bonded portion 13.

Here the vicinities near both edges of the diaphragm 4 shall be termed the edge portion 6. In the edge portion 6, the end on the second semiconductor layer 3 side extends further towards the outside, with a width dimension T of between about 5 and 50 μm, further then the opening portions 1a and 2a that are formed in the first semiconductor layer 1 and the insulating layer 2. Here the width dimension T is the dimension with which the side edge of the second semiconductor layer 3 extends towards the outside using, as a reference, the side wall edge portion of the second semiconductor layer 3 at the opening portion 1a of the first semiconductor layer 1. Furthermore, the side edge of the second semiconductor layer 3 is formed into a R shape. This makes it possible to mitigate the concentration of stresses. Additionally, the because this enables an increase in size of the diaphragm 4, this enables a small and highly accurate pressure sensor 30.

Figure 3:
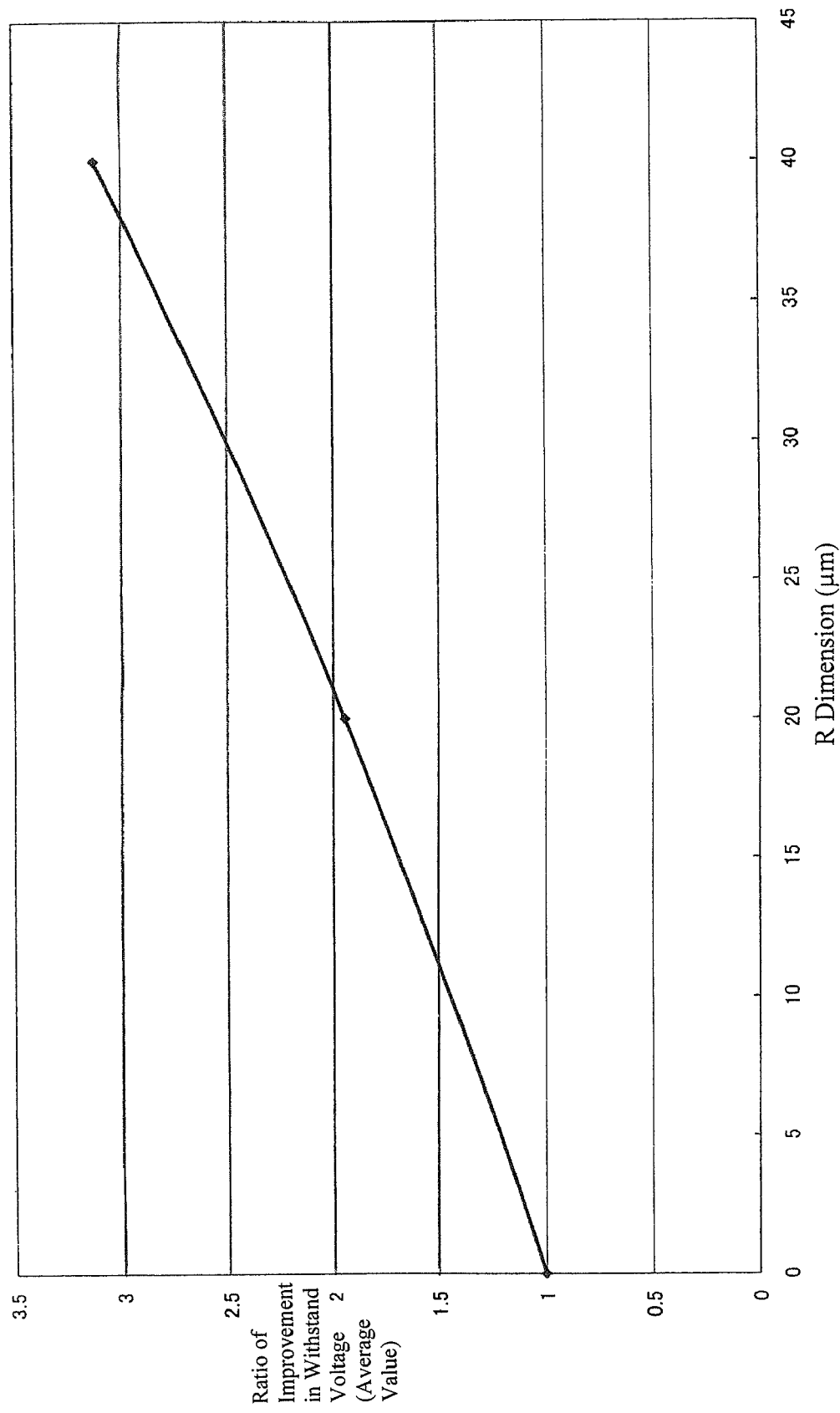
FIG. 3 is a diagram illustrating the effects when the side edge of the second semiconductor layer is processed into an R shape in a pressure sensor according to a form of embodiment according to the present invention.

FIG. 3 is a diagram illustrating the effects in the case wherein the side edges of the second semiconductor layer 3 have been processed into a R shape. The horizontal axis is the R dimension, corresponding to the width dimension T, described above. Note that, as will be described below, this R shape is formed through performing specific etching of the second semiconductor layer 3 that is essentially isotropic, where the width dimension T and the dimension in the depth direction of the R shape are essentially identical. The vertical axis is the ratio of increase in the withstand voltage wherein the magnitude of the withstand voltage of a pressure sensor wherein the R dimension (the width dimension T) is zero, or in other words, when there is no R shape, is defined as 1 (the reference), illustrating that the withstand voltage becomes larger when the R dimension (the width dimension T) is larger. When withstand voltage experiments were performed for pressure sensors wherein the R dimension was 0, 20, and 40 μm, an effect was obtained wherein the greater the R dimension, the higher the withstand voltage.

Here having the lower limit for the width dimension T for the extension towards the outside be about 5 μM is because this is able to achieve an increase in the withstand voltage of about 10% in comparison to the case wherein there is no R shape, from FIG. 3, and taking into account also the dimensional variability due to processing. On the other hand, while increasing the width dimension T can increase the withstand voltage, because this would also increase the variability in the thickness of the diaphragm 4, the upper limit is about 50 μm.

Note that an increase in the withstand voltage can be achieved insofar as the width dimension T is in excess of 0, and thus this does not reject those cases of less than 5 μm or more than 50 μm.

Figure 4:
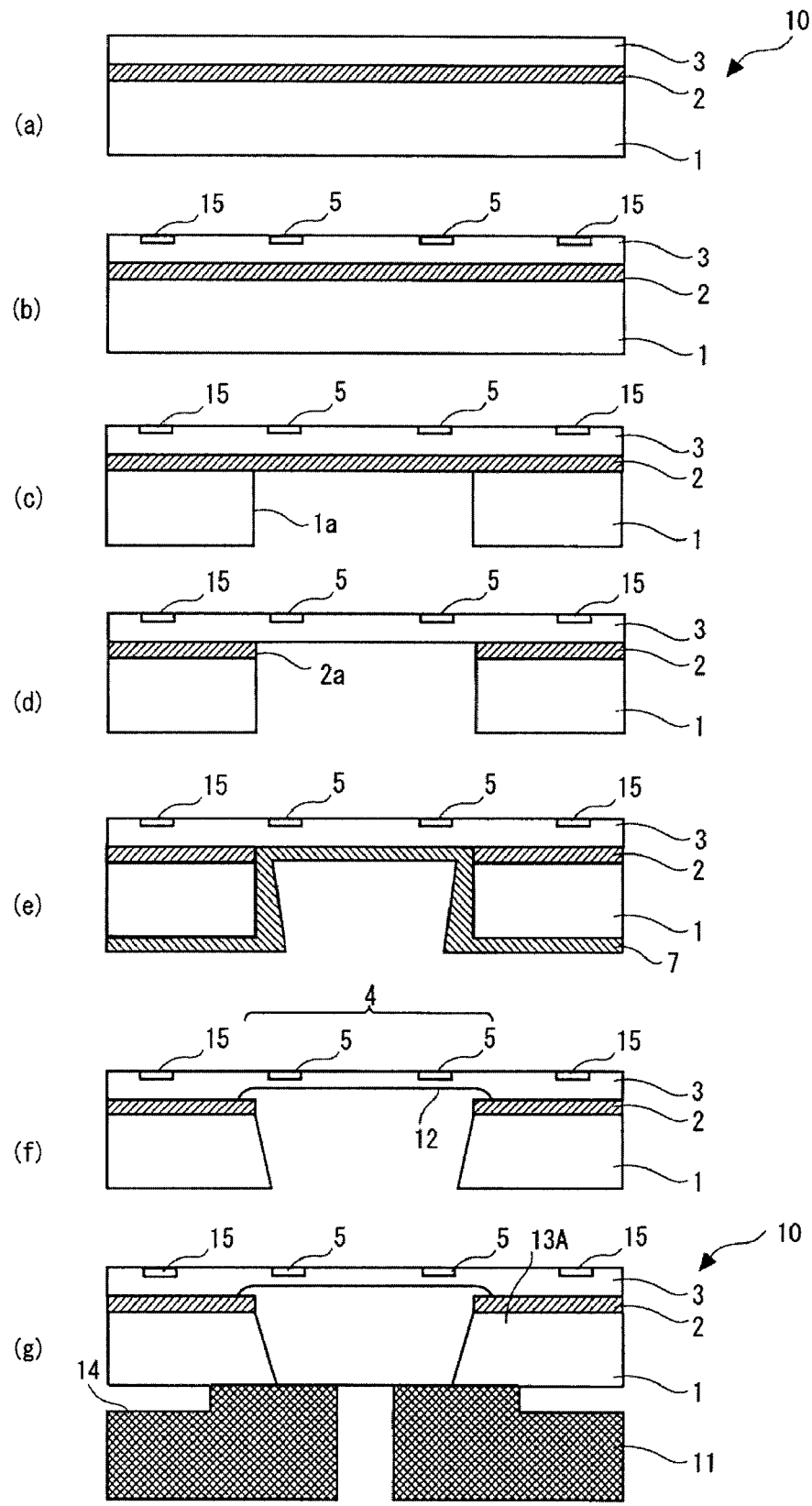
FIG. 4 is a process cross-sectional diagram illustrating a manufacturing process for a pressure sensor according to a form of embodiment according to the present invention.
Figure 5:
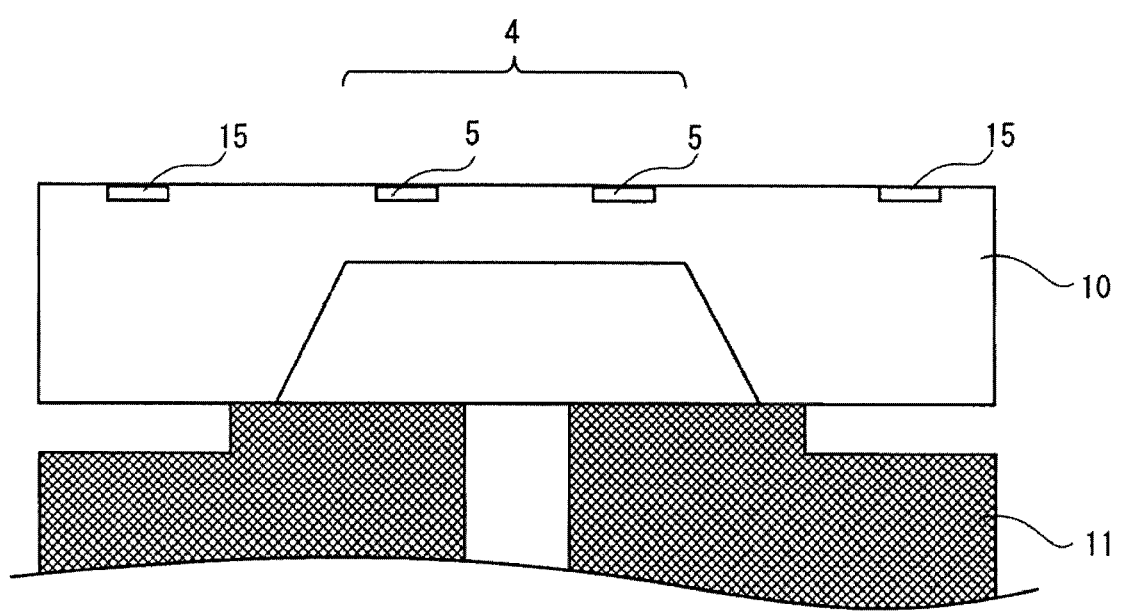
FIG. 5 is a side view cross-sectional diagram illustrating a structure for a conventional pressure sensor.

FIG. 4 will be used next to explain the method for manufacturing the pressure sensor 30. FIG. 4 is a process cross-sectional diagram illustrating a method for manufacturing a pressure sensor. First, as illustrated in FIG. 4 (a), an SOI (Silicon on Insulator) wafer comprising a first semiconductor layer 1, an insulating layer 2 approximately 0.5 μm thick, and a second semiconductor layer 3 is prepared. In fabricating the SOI wafer, the SIMOX (Separation by IMplanted OXygen) technology that forms an $SiO_2$ layer through implanting oxygen into a silicon substrate may be used, an SDB (Silicon Direct Bonding) technology wherein two silicon substrates are bonded together may be used, or another method may be used.

The second semiconductor layer 3 is planarized and thinned. For example, a polishing method known as CCP (Computer-Controlled Polishing) may be used to polish the second semiconductor layer 3 to a specific thickness (for example, 80 μm).

As illustrated in FIG. 4 (b), strain gauges (piezo resistance regions) 5 and 15 are formed from p-type silicon, or the like, through impurity diffusion or an ion implantation method on the top surface of the second semiconductor layer 3. The result will be the formation of the strain gauges 5 in the diaphragm 4 of the second semiconductor layer 3, as will be described below. This will also form the strain gauges 15 on the outside of the diaphragm 4. This forms the structure illustrated in FIG. 4 (f). Note that the strain gauge 5 is any of the aforementioned strain gauges 5a through 5d, and the strain gauge 15 is any of the aforementioned strain gauges 15a through 15d. After this, an $SiO_2$ layer (not shown) is formed on the top surface of the second semiconductor layer 3, and, after the fabrication of a contact hole in the $SiO_2$ layer over the strain gauge 5, a metal electrode (not shown) for obtaining electrical contact with the strain gauge 5 is deposited through vapor deposition into the contact hole portion. Note that the process for forming the metal electrode may be performed anywhere between FIG. 4 (a) and FIG. 4 (f).

An $SiO_2$ layer or a resist (not shown) is formed on the bottom surface of the SOI wafer formed in this way. An opening portion 1a is formed in the $SiO_2$ layer or the resist that corresponds to the pressure sensitive region (the region wherein the diaphragm 4 will be formed). Then the $SiO_2$ layer or the resist, patterned in this way, is used as an etching mask for forming the diaphragm, and the first semiconductor layer 1 is etched (first etching). Here the first semiconductor layer 1 is processed through dry etching. More specifically, the first semiconductor layer 1 is etched using the ICP Bosch process. The Bosch process performs anisotropic etching, and thus the side walls of the first semiconductor layer 1 are essentially vertical.

Note that in the Bosch process, etching steps and passivating steps (deposition steps) are performed alternatingly. The etching steps and the passivating steps are performed repetitively every few seconds. In the etching steps, etching is performed isotropically using, for example, $SF_6$ gas. In the passivating steps, the side walls are protected using, for example, a fluorocarbon gas (such as, for example, the $C_4F_8$, or the like). That is, a layer to protect the side wall is deposited on the first semiconductor layer 1. Doing so controls the etching in the sideways direction during the etching step, enabling anisotropic etching to be performed on the first semiconductor layer 1. The use of the Bosch process in this way enables deep etching of the silicon, to form a vertical trench structure.

Here the insulating layer 2 functions as an etching stopper. Because of this, while the etching proceeds steadily in the opening portion 1a, the etching rate drops when the insulating layer 2 is reached. In this way, the first semiconductor layer 1 is removed until the insulating layer 2 is exposed. Doing so exposes the insulating layer 2 through the formation of the opening portion 1a in the first semiconductor layer 1 in the portion that is in the center of the chip, which will form the pressure sensor, as illustrated in FIG. 4 (c). Insofar as the etching is anisotropic, the first semiconductor layer 1 may be etched through etching aside from that of the Bosch process.

Following this, the insulating layer 2 is etched using the first semiconductor layer 1 as the etching mask. For example, the insulating layer 2 may be processed through wet etching using a solution of HF, or the like. Of course, the insulating layer 2 maybe etched using a different etchant, or may be etched through dry etching. The insulating layer 2 that was exposed by the etching of the first semiconductor layer 1 is removed to form the structure illustrated in FIG. 4 (d). In this way, the opening portion 2a is formed in the insulating layer 2, thereby exposing the second semiconductor layer 3 in the portion that will form the pressure sensitive region. At this time, the diameters of the opening portions 1a and 2a in the first semiconductor layer 1 and the second semiconductor layer 2 are essentially identical.

Next a passivating layer 7, having a specific thickness, is formed on the surface of the wafer. At this time, the passivating layer 7 that is formed on the side walls in the opening portion 1a of the first semiconductor layer 1 is formed to have a thickness distribution so that, at the time of the second etching process, described below, the side walls in the opening portion 1a of the first semiconductor layer 1 will have a specific angle θ. That is, on the side walls in the opening portion 1a of the first semiconductor layer 1, if the passivating layer 7 is formed with a thickness distribution such that it is thinner towards the second semiconductor layer 3 side than towards the base 11 side so that the etching will proceed from the base 11 side towards the second semiconductor layer 3 side, then the structure will be as illustrated in FIG. 4 (e). Note that the passivating layer 7 is formed over the entirety of the wafer. Consequently, the passivating layer 7 is formed so as to cover the first semiconductor layer 1. Furthermore, the passivating layer 7 is formed also on the side walls in the opening portion 2a of the insulating layer 2 and on the exposed portion of the second semiconductor layer 3.

The passivating layer 7 is formed by performing the passivating step in the Bosch process. That is, the passivating layer 7 is formed using a gas that includes carbon atoms and fluorine atoms, such as $C_4F_8$. Here the passivating layer 7 is formed from a fluorocarbon layer because a fluorocarbon gas is used. The passivating layer 7 is deposited over the entire surface of the wafer thereby. Note that the passivating layer 7 may be formed through repetitively performing a passivating step that is several seconds long, or the passivating layer 7 may be formed through continuing the passivating step over a longer period of time. Furthermore, the passivating layer 7 may be formed through a process other than the Bosch process. For example, the passivating layer 7 may be formed from photoresist, or the like. Conversely, the passivating layer 7 may instead be deposited using CVD (Chemical Vapor Deposition), or the like. Furthermore, insofar as the passivating layer 7 is formed on the side walls in the opening portion 1a of the first semiconductor layer 1, it need not be formed on the other portions.

Thereafter, the first semiconductor layer 1, the insulating layer 2, and the second semiconductor layer 3 are etched (second etching) in the state wherein the passivating layer 7 has been formed. Doing so causes the side walls in the opening portion 1a of the first semiconductor layer 1 to form inclined surfaces having a specific angle θ. The result is that, in the opening portion 1a of the first semiconductor layer 1, the opening diameter on the second semiconductor layer 3 side will be larger than the opening diameter on the base 11 side. Together with this, a recessed portion 12, for forming the diaphragm 4, is formed in the second semiconductor layer 3. The depth of the etching of the second semiconductor layer 3 is controlled to a specific extremely small value (between about 5 and 50 μm) through time control. At this time, the second semiconductor layer 3 is etched sideways, towards the outside, by between about 5 μm and 50 μm, further that the side wall in the opening portion 2a of the insulating layer 2.

Here the etching step of the Bosch process, or the like, may be used. That is, dry etching is performed using a gas that contains sulfur atoms and fluorine atoms ($SF_6$). At this time, performing the dry etching in a state wherein the bias voltage is controlled towards the first semiconductor layer 1 and the second semiconductor layer 2 accelerates the ions towards the second semiconductor layer 3. Because of this, the speed of the ions in the vertical direction that will be greater than the speed in the horizontal direction. The majority of the ions in the plasma will be directed towards the second semiconductor layer 3 in the opening portions 1a and 2a of the first semiconductor layer 1 and the insulating layer 2. Consequently, the frequency of impact of the ions against the passivating layer 7 that is formed on the surface of the second semiconductor layer 3 will be high, so that the passivating layer 7 that is formed on the surface of the second semiconductor layer 3 will be etched at an etching rate that is somewhat high.

On the other hand, for the same reasons as described above, the frequency with which ions impact the passivating layer 7 that is formed on the side walls in the opening portions 1a and 2a in the first semiconductor layer 1 and the insulating layer 2 will be relatively low, and thus the etching rate of the passivating layer 7 that is formed on the side walls of the first semiconductor layer 1 and the insulating layer 2 will be low. Because of this, the passivating layer 7 is formed taking into account the gas flow rates and other conditions that will be applied to the first semiconductor layer 1 and the second semiconductor layer 3 so that not only will a recessed portion 12 of a specific shape be formed in the second semiconductor layer 3, but also the side walls of the opening portion 1a of the first semiconductor layer 1 will be etched into inclined surfaces having a specific angle θ. Furthermore, strictly, because the etching rate of the insulating layer 2 is lower than that of the first semiconductor layer 1, at the time of the second etching process, the insulating layer 2 will protrude further than the edges of the opening of the opening portion 1a of the first semiconductor layer 1 on the second semiconductor layer 3 side, so that, at the time of the second etching process, the passivating layer 7 is formed so that the opening edges in the first semiconductor layer 1 on the second semiconductor layer 3 side will form and R shape, so that this will not be a location wherein stresses accumulate. Note that, strictly, because the etching rate for the insulating layer 2 is less than that for the first semiconductor layer 1, after the second etching process, the insulating layer 2 will protrude further than the edges of the opening in the opening portion 1a of the first semiconductor layer 1 on the second semiconductor layer 3 side. This protruding portion does not damage the performance of the sensor, and in some cases, can be removed through a wet etching process, such as HF.

Additionally, when the passivating layer 7 on the front surface of the second semiconductor layer 3 is removed to expose the second semiconductor layer 3, then the second semiconductor layer 3 is etched isotropically. Consequently, the second semiconductor layer 3 is side-etched. The side edges that are formed through the removal of the second semiconductor layer 3 through side etching extend to the outside of the opening portions 1a and 2a of the first semiconductor layer 1 and the insulating layer 2. That is, the positions of the side edges of the second semiconductor layer 3 are shifted from the side edges of the first semiconductor layer 1 and the second semiconductor layer 2. The recessed portion 12 for forming the diaphragm 4 is larger than the opening portions 1a and 2a of the first semiconductor layer 1 and the insulating layer 2. Then, when the wafer is cleaned in a chemical solution, or the like, to remove the passivating layer 7 that has been formed on the wafer, the structure will be as illustrated in FIG. 4 (f). In this way, the first semiconductor layer 1 is side-etched to form the side walls in the opening portion 1a of the first semiconductor layer 1 into inclined surfaces having a specific angle θ. This makes it possible to increase the bonding region of the sensor chip 10 to the base 11. Additionally, the second semiconductor layer 3 is side-etched, to form, in the second semiconductor layer 3, a recessed portion 12 that is larger than the etched portion of the insulating layer 2. Doing so enables the pressure sensitive region to be made larger. The side edges of the second semiconductor layer 3 are processed into the R shape through side etching. This make it possible to mitigate the concentration of stresses.

The diaphragm 4 is formed in the second semiconductor layer 3 in this way. The amount of etching of the second semiconductor layer 3 is small, at between about 5 and 50 μm, and thus there is no variability in the thickness due to etching, enabling the diaphragm 4 to have a uniform thickness. This enables an increase in the measurement accuracy. Furthermore, because the insulating layer 2 does not remain on the diaphragm 4, this is able to increase the strength of the edge portion 6.

Additionally, the passivating step of the Bosch process is used in the process for forming the passivating layer 7, and the etching step of the Bosch process, or the like, is used in the second etching process. This enables processing to be performed continuously within the same equipment, and thus enables an improvement in productivity. Furthermore, the first etching can be performed using the same equipment through performing a Bosch process, enabling an even greater improvement in productivity. Of course, the first semiconductor layer 1 and the second semiconductor layer 3 can be etched through other etching methods instead.

Furthermore, a base 11 is bonded to the back surface side of the sensor chip 10. Here only the bonded portion 13A is bonded, and the non-bonded portions 13 are not bonded. Doing so forms the structure illustrated in FIG. 4 (g). The sensor chip 10 and the base 11 are bonded together directly using, for example, anode bonding. This concludes the fabrication of the pressure sensor.

In this way, the second etching is performed using isotropic etching, and thus the recessed portion 12 of the second semiconductor layer 3 can be made to be larger than the opening portions 1a and 2a. Doing so enables the bonded portion 13A to be made large, even when the surface area of the pressure sensitive region is increased in size. In particular, when it comes to the opening portion 1a of the first semiconductor layer 1, the opening diameter on the second semiconductor layer 3 side is larger than the opening diameter on the base 11 side, enabling the bonded portion 13A to be made even larger. This results in the ability to increase the bonding reliability. Furthermore, because the side edges of the second semiconductor layer 3 of the pressure sensitive region side are processed into an R shape, it is possible to mitigate the concentration of stresses. This not only makes it possible to achieve the miniaturization of the sensor chip, but to also obtain a sensor with high performance.

It should be added that while in the explanation set forth above the explanation was for an example wherein an insulating layer 2 was used, insofar as a manufacturing method is used wherein it is possible to adjust the etching rate and time of the first etching and possible to fully ensure the thickness of the second semiconductor layer 3 even without the insulating layer 2 (the stopper), then it is not absolutely necessary that the insulating layer be provided in the present pressure sensor. Additionally, while in the explanation above the diaphragm was formed as a square, it may instead be formed in a polygon shape or in the shape of a circle.

The invention claimed is:

1. A pressure sensor comprising:
a sensor chip having a first semiconductor layer that has an opening portion, and a second semiconductor layer, which has a recessed portions that forms a diaphragm, formed on the first semiconductor layer; and
a base, bonded to the sensor chip, having a pressure guiding hole that connects to the opening portions; wherein
the recessed portion of the second semiconductor layer is larger than the opening portion of the first semiconductor layer; and
the opening diameter of the opening portion of the first semiconductor layer at the second semiconductor layer side is larger than the opening diameter at the base side.

2. A pressure sensor as set forth in claim 1, wherein an insulating layer having an opening portion is formed between the first semiconductor layer and the second semiconductor layer.

3. A pressure sensor as set forth in claim 1, wherein a non-bonded portion, wherein a gap is provided between the sensor chip and the base, is formed at a periphery of a bonded portion between the sensor chip and the base.

4. A pressure sensor as set forth in claim 1, wherein:
the edge of the opening in the recessed portion of the second semiconductor layer extends to the outside with a width dimension of no less than 5 μm and no more than 50 μm beyond the side wall of the opening portion on the second semiconductor layer side in the first semiconductor layer.

5. A method for manufacturing a pressure sensor that has a sensor chip that is provided with a first semiconductor layer and with a second semiconductor layer that forms a diaphragm that is a pressure sensitive region, comprising:
a step for anisotropically etching the first semiconductor layer to form an opening portion in the first semiconductor layer in a part that becomes the pressure sensitive region;
a step for forming a passivating layer on the side wall in the opening portion of the first semiconductor layer with a thickness distribution so that the film thickness will be thinner on the second semiconductor layer side;

a step, after the formation of the passivating layer, for etching the side wall in the opening portion of the first semiconductor layer so as to form an opening portion of the first semiconductor layer so that the opening diameter on the second semiconductor layer side will be larger than the opening diameter on the other side, and also for etching the second semiconductor layer in the part that will form the pressure sensitive region to form, in the second semiconductor layer, a recessed portion that is larger than the opening portion of the first semiconductor layer, in order to form the diaphragm; and a step for bonding the base to the sensor chip.

6. A method for manufacturing a pressure sensor as set forth in claim 5, further comprising:

a step, after the step for forming the opening portion by anisotropically etching the first semiconductor layer, for providing an opening portion by etching an insulating layer that is provided between the first semiconductor layer and the second semiconductor layer; wherein in the process for forming the opening portion in the first semiconductor layer, the insulating layer that is provided between the first semiconductor layer and the second semiconductor layer is used as an etching stopper, and etching is performed anisotropically.

7. A pressure sensor manufacturing method as set forth in claim 5, wherein:

in the step for bonding the base to the sensor chip, a non-bonded portion, provided with a gap between the sensor chip and the base, is formed at a periphery of a bonded portion between the sensor chip and the base.

* * * * *